United States Patent Office 2,925,132
Patented Feb. 16, 1960

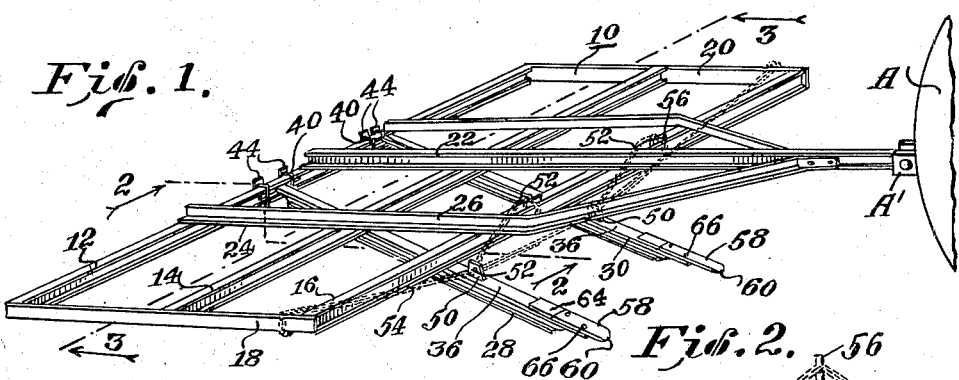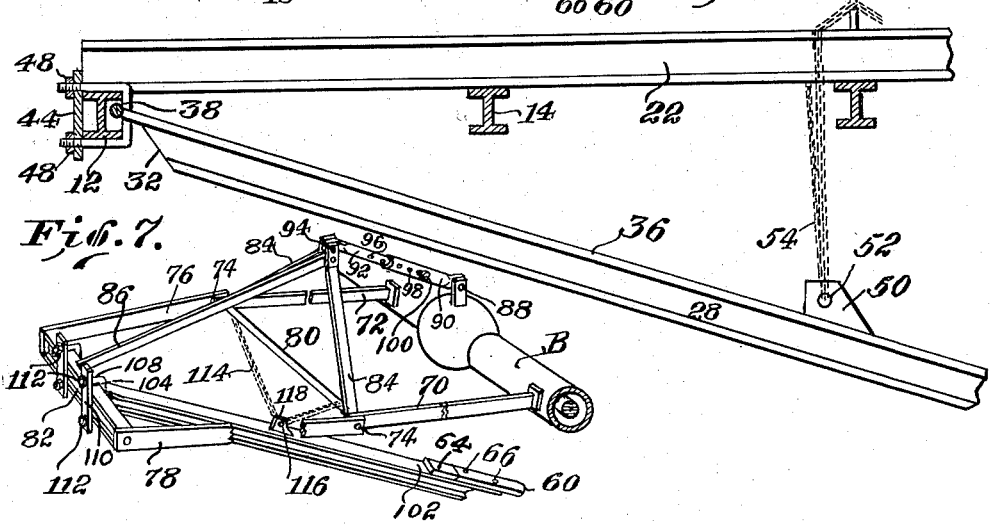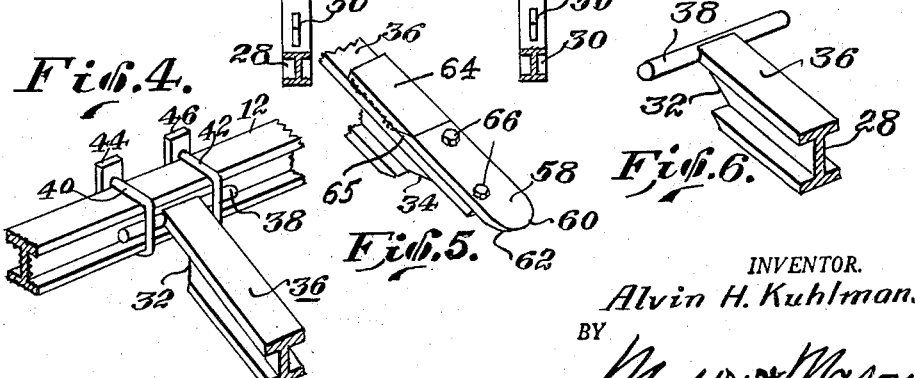
INVENTOR.
Alvin H. Kuhlman,
BY
Mason & Mason
Attorneys.

2,925,132

AGRICULTURAL CHISEL

Alvin H. Kuhlman, Canyon, Tex.

Application June 19, 1956, Serial No. 592,397

5 Claims. (Cl. 172—699)

The present invention relates to a soil working implement, and in particular to an agricultural chisel for elevating and turning the soil.

An object of the invention is to provide a chisel which leaves a large furrow to thereby retain snow and rain and which provides maximum protection against soil-blowing.

Another object of the invention is to provide a soil implement which will work in drier and harder soils, and which will penetrate to a greater depth than other soil working implements, such as a lister.

An additional object is to provide an agricultural chisel which may be readily adjusted to different depths of soil.

A further object is to provide an implement of this type that will work in wetter soils than other similar implements may work, and which lifts the soil up and out, the sub soil being gradually lifted up the gentle slope of the chisel and deposited on the top of the ground to be acted upon by the weather.

Yet another object is to provide a chisel comprising an inclined beam having a very low angle whereby to provide a minimum of resistance of the movement of the soil up the inclined top surface of the chisel, and to thereby save power in the tillage of soil.

Another object is the provision of an agricultural chisel that is easily adapted for attachment to varied types of agricultural implements such as wheel or drag implements, or for direct attachment to a tractor.

Other objects will appear hereinafter throughout the specification.

In the drawings:

Figure 1 is a perspective view of a chisel lister plow frame having mounted thereon two agricultural chisels;

Figure 2 is a view taken on the line 2—2 of Figure 1;

Figure 3 is a view taken on the line 3—3 of Figure 1;

Figure 4 is a perspective partly broken away detail view showing the attachment of one of the chisels to the rear frame member;

Figure 5 is a perspective partly broken away detail view of the chisel wih a point attached thereto;

Figure 6 is a view similar to Figure 5 but showing the upper end of the chisel; and Figure 7 is a perspective view of a modified construction.

The present invention relates particularly to an improved agricultural chisel that may be readily attached to the framework of a lister, harrow or other agricultural implement, or it may be attached to a tractor or similar vehicle. The chisel penetrates the soil, which elevates and breaks the soil as it moves up the inclined slope of the upper surface thereof, leaving a large furrow for holding snow and rain, to thereby furnish maximum protection against soil blowing in dry weather.

Referring now to the structure shown in Figures 1 to 6, A is a tractor or other source of motive power having a tractor hitch A'. Attached to the tractor hitch is a metallic framework 10 of an agricultural implement of any suitable type. This framework comprises a plurality of substantially parallel spaced transversely extending I-beams 12, 14 and 16. Although the transverse I-beam construction shown is preferred, it will be understood that other types of frame members may be substituted therefor. Suitably attached by welding or by bolts, not shown, are the side pieces 18 and 20. These may be of U-shaped construction as shown in Figure 3, although other cross-sectional shapes of side pieces may be substituted therefor.

Extending rearwardly from the tractor hitch A' and attached to the I-beams 12, 14 or 16 by bolts is a superposed frame comprising a central I-beam member 22 by angle members 24 and 26.

As indicated in Figures 1 and 3, I provide a pair of spaced chisels 28 and 30. Any suitable number of chisels may be used, however. For purposes of strength these chisels may comprise I-beams, with their upper and lower ends having a cut-away portion 32 at the rear end, and a cut-away portion 34 at the front end, as shown in Figures 2, 4 and 6.

It will be noted that each of the chisels is provided with a flat upper surface 36 which supports the upwardly moving soil.

The rear end of the chisel is provided with a pivot pin 38, the same projecting laterally on each side thereof as shown particularly in Figure 4. Each pivot pin is pivotally mounted on the I-beam 12 by a pair of U-bolts 40 and 42. These U-bolts span the I-beam and are adjustably held in place by plates 44 and 46 and nuts 48 that threadedly engage the ends of the U-bolts.

Each chisel is provided with an upwardly extending fin 50 having an aperture 52 for the reception of one or more chains 54 which form a V-suspension means for the pair of chisels. It will be understood that the chains are secured in the apertures 52 in such a manner as to prevent lateral movement of the chisels. The opposite ends of the chains are attached in any suitable manner to the side pieces 18 and 20, as shown in Figures 1 and 2, by upstanding projections 56 having keyhole slots not shown, whereby the ends of the chains may be secured in the lower ends of the keyhole slots to prevent movement of the chains after having been threaded through the upper ends thereof.

Referring now to Figure 5, the point of the chisel comprises a removable plate 58 having a rounded soil-engaging sharpened end 60 whose underside is beveled as shown at 62. The plate is provided with a pair of apertures through which extend bolts 66 whereby the plate 58 may be adjustably and removably held to the flat upper surface 36 of the chisel. The rear end is beveled to lock with the beveled forward end 65 of plate 64. The latter is fixed as by welding to the upper surface 36.

It will be understood that any suitable number of chisels may be removably attached to the framework in the manner illustrated in the several figures, including Figure 7, presently to be described. It will also be understood that the chains may be adjusted to regulate the depth of the points 58 which penetrate the soil. This depth may vary from six inches to several feet, depending upon the conditions of the soil, i.e. the amount of moisture it contains, and/or the type of soil being worked.

Referring to Figure 7, which shows a modified construction, the letter B indicates the rear axle of a tractor or similar implement forming the source of power. Attached thereto as by welding are rearwardly extending frame members 70 and 72. Pivotally attached at 74 to the rear ends of these members is a framework comprising rearwardly extending side frame pieces 76 and 78 and transverse frame pieces 80 and 82. Inclined upwardly from the pivot 74 and on opposite ends of frame piece 80 are supporting members 84, and extending from their meeting point is the brace 86 which is rigidly connected at its opposite end by welding or other suitable means to the frame piece 82. An adjustable sleeve construction is provided for raising and lowering the frame members 76, 78 and 82 on the pivot 74. Extending upwardly from the tractor axle is a supporting member 88 to which is pivotally attached an outer sleeve member 90. Slidably movable in this sleeve member is the inner sleeve member 92 that is pivotally mounted at 94 on the vertical supporting members 84. Each sleeve member is provided with a plurality of apertures 96 and 98. The sleeve member 92 may be adjustably held in a plurality of positions within sleeve member 90 by the pin 100 which is removably engaged in the apertures 96 and 98. This construction provides means for adjustably regulating the depth of the cut by means of adjusting the frame members 76, 78 and 82 pivotally about the pivot 74.

The chisel 102 is provided with a pivot pin 104 at its rear end. The chisel is held in proper pivoted position by the U-bolt 108, plate 110, and the nuts 112, which latter threadedly engage the ends of the U-bolt.

An additional means whereby to adjust the angle of the chisel and thereby regulate the depth of soil penetration includes chains 114 whose ends are attached in any suitable manner to the transverse frame piece 80. These chains form a V as seen in Figure 7. The amount of chain used to form the loops or V regulates the angle of penetration of the chisel. The chains threadedly engage the aperture 116 of the fin 118. In actual practice this fin will be placed slightly forward of the position shown in Figure 7, its position in this figure being shown slightly rearwardly solely for purposes of illustration.

The chains 114 are fixedly engaged in the aperture 116 by any suitable means such as clamping rings on either side of the fin (not shown), to thereby prevent sidewise movement of the chisel during turning movements and at other times. Any other suitable means such as by welding the chain to the fin of either form of the invention, may be employed to prevent the chain from slipping in the aperture of the fin. Plate 60 is mounted on the chisel as shown in Figure 5.

While the device as shown and described herein is admirably adapted to fulfill the objects and features of advantage previously enumerated as desirable, it is to be understood that the invention is not to be limited to these specific features, but that the means and construction herein disclosed are susceptible of modification in form, proportion, and arrangement of parts without departing from the principle involved or sacrificing any of its advantages; and the invention is, therefore, claimed in embodiments of various forms, all coming within the scope of the claims which follow.

I claim:
1. An agricultural chisel construction comprising a frame means, at least one chisel, means pivotally mounting the rear end of said chisel to said frame means, said chisel comprising an I-beam, the ends thereof having cutaway portions at the under sides thereof, said chisel having a ground-engaging point, said frame means including a pair of longitudinally extending frame members, each frame member of said pair being spaced laterally on an opposite side of the said ground engaging point than the other frame member, said frame members being located above the ground engaging point of said chisel and means intermediate the ends of said chisel for additionally adjustably supporting said chisel intermediate the chisel point and the said rear end thereof, said last named means comprising a chain attached to said frame means, and a connecting means for said chain and chisel for preventing lateral movement of said chisel along said chain transversely of the longitudinal axis of the frame means, said chain being of such length as to form a V with the ends connected to the frame means and the apex of the V fixedly connected to said chisel.

2. The structure of claim 1 wherein the means for pivotally mounting the rear end of said chisel to said frame means comprises a pivot pin on said chisel rear end, and adjustable means supporting said pin on said frame means whereby to laterally adjust said chisel along the width of said frame means and transversely to the line of travel of said chisel.

3. The structure of claim 1 wherein the means for pivotally mounting the rear end of said chisel to said frame means comprises a pivot pin on said chisel and a pair of U-bolts mounted on said frame means extending around said pivot pin and having means adjustably mounting the same on said frame means, whereby to laterally adjust said chisel along the width of said frame means and transversely to the line of travel of said chisel.

4. An agricultural chisel construction comprising a frame means, at least one chisel having an elevated rear end, means pivotally mounting said rear end of said chisel to said frame means, said chisel comprising an I-beam, the ends thereof having cut-away portions at the under sides thereof, said chisel having a ground-engaging point, said frame means including a pair of longitudinally extending frame members, each frame member of said pair being spaced laterally on an opposite side of the said ground engaging point than the other frame member, said frame members being located above the ground engaging point of said chisel and a chain intermediate the ends of said chisel for additionally supporting said chisel intermediate said chisel point and the said rear end thereof, said frame means including a pivot means, and frame members pivotally and adjustably mounted on said pivot means, and a connecting means for said chain and chisel for preventing lateral movement of said chisel along said chain transversely of the longitudinal axis of the frame means, said chain being of such length as to form a V with the ends connected to the frame means and the apex of the V fixedly connected to said chisel.

5. An agricultural chisel construction comprising a frame means, at least one chisel, means pivotally mounting the rear end of said chisel to said frame means, said chisel having a ground-engaging point, said frame means including a pair of longitudinally extending frame members, each frame member of said pair being spaced laterally on an opposite side of the said ground engaging point than the other frame member, said frame members being located above the ground engaging point of said chisel and a chain intermediate the ends of said chisel for additionally adjustably supporting said chisel intermediate the chisel point and the said rear end thereof, means removably securing said point to said chisel comprising a rear end having an inclined portion, a plate permanently secured to said chisel having a forwardly inclined portion in juxtaposed position with said chisel point inclined portion, and removable fastening means connecting said point to said chisel, and a connecting means for said chain and chisel for preventing lateral movement of said chisel along said chain transversely of the longitudinal axis of the frame means, said chain being of such length as to form a V with the ends connected to the frame means and the apex of the V fixedly connected to said chisel.

References Cited in the file of this patent

UNITED STATES PATENTS

| | | |
|---|---|---|
| 37,894 | Bell et al. | Mar. 17, 1863 |
| 39,760 | Smith | Sept. 1, 1863 |
| 42,513 | Phillips et al. | Apr. 26, 1864 |
| 43,470 | Barney | July 12, 1864 |
| 174,013 | Seabrook et al. | Feb. 22, 1876 |
| 177,666 | Tanner | May 23, 1876 |
| 959,528 | Herscher | May 31, 1910 |
| 2,566,547 | Bartlett | Sept. 4, 1953 |

FOREIGN PATENTS

| | | |
|---|---|---|
| 495,141 | Canada | Aug. 11, 1953 |